US010987892B2

(12) United States Patent
Law

(10) Patent No.: US 10,987,892 B2
(45) Date of Patent: Apr. 27, 2021

(54) METHOD OF MANUFACTURING MOLDED ARTICLE

(71) Applicant: Calvin Law, Chino, CA (US)

(72) Inventor: Calvin Law, Chino, CA (US)

( * ) Notice: Subject to any disclaimer, the term of this patent is extended or adjusted under 35 U.S.C. 154(b) by 329 days.

(21) Appl. No.: 16/053,689

(22) Filed: Aug. 2, 2018

(65) Prior Publication Data
US 2020/0039116 A1 Feb. 6, 2020

(51) Int. Cl.
B32B 5/02 (2006.01)
B32B 1/02 (2006.01)
B29C 33/38 (2006.01)
B29C 70/22 (2006.01)
B29C 70/44 (2006.01)
B29K 33/20 (2006.01)
B29K 105/08 (2006.01)

(52) U.S. Cl.
CPC ............... *B32B 5/02* (2013.01); *B29C 33/38* (2013.01); *B29C 70/222* (2013.01); *B29C 70/443* (2013.01); *B32B 1/02* (2013.01); *B29K 2033/20* (2013.01); *B29K 2105/0845* (2013.01); *B29K 2909/08* (2013.01); *Y10T 428/1362* (2015.01)

(58) Field of Classification Search
CPC ........... B32B 1/02; B32B 5/02; B29C 70/222; B29K 2033/20; Y10T 428/1362
See application file for complete search history.

*Primary Examiner* — Walter Aughenbaugh
(74) *Attorney, Agent, or Firm* — Alexander Chen, Esq.

(57) ABSTRACT

A method of manufacturing a design-imprinted molded article comprises providing a glass mold of a desired shape, that further comprises a desired shaped concave and a desired shaped rim, providing a plurality of sheets of polyacrylonitrile fibers, providing at least one design cutout of polyacrylonitrile fibers, overlaying the plurality of sheets on the surface of the desired shaped concave and desired shaped rim, overlaying the design cutout on the plurality of sheets, and applying high heat to the glass mold.

9 Claims, 9 Drawing Sheets

METHOD OF MANUFACTURING MOLDED ARTICLE

FIELD OF USE

The present disclosure relates generally to a method of manufacturing a molded article, and more particularly to a method of manufacturing hard-sided luggage comprising design element(s).

BACKGROUND

Luggage is commonly soft-sided or hard-sided. The majority of luggage is soft-sided. Canvas, nylon and other similar fabric materials are used to manufacture soft-sided luggage. To construct soft-sided luggage, non-shape retaining sheets of fabric material can be assembled together, for example, by sewing. Alternatively, shape-retaining sheets of fabric material can also be used to provide some structure to the component parts. However, soft-sided luggage has the disadvantage of high material cost, high assembly cost and increased overall weight of required construction materials. The increased weight becomes a major drawback to such methods of luggage construction and in addition there are also drawbacks and limitations on style designs.

With regard to soft-sided luggage, a design element may be affixed as through sewing or adhesive as well as imbedded into the material as through embroidering. Further, where soft-sided materials such as fabric are used for construction, the outward design and appearance of the luggage may be agreeable esthetically and to the touch, but when external forces are applied, the force is directly transferred to the contents of the luggage. In order to overcome this disadvantage of soft-sided luggage, it has been suggested that a structure with a square frame be inserted into the body of the luggage to maintain a shape of the luggage. However, this structure is incapable of maintaining the contents in the luggage in their original form and adds additional cost in materials and increases the overall weight of the luggage further adding drawbacks to this current iteration. Additionally, less security is afforded by soft-sided luggage as thieves are able to cut through fabric to break into the luggage. Further, soft-sided luggage commonly comprises external pockets which can be susceptible to receiving unwanted items that are put in without an owner's knowledge further compromising the safety of the soft-sided luggage. Finally, the fabric material used for soft-sided luggage is prone to wear and tear by, for example, fraying, pulling or ripping. This also leads to decreased security as contents may fall out of holes. This increased proclivity to wear and tear further reduces the already limited ability of soft-sided luggage to provide protection for the items inside the luggage. As such, soft-sided luggage is less likely to have the ability to absorb the impact from bumps and knocks leaving the contents vulnerable to damage or destruction.

On the other hand, benefits of hard-sided luggage include its improved strength as well as reduced weight. Additionally, security is improved by hard-sided luggage because the hard shell reduces theft through case slitting or tampering with the external pockets. Further, maximum packing space is achieved by hard-sided luggage due to the thin shell construction as the packing space inside is not given over to folds of fabric and lining. Protection of a user's belongings is also improved with hard-sided luggage as the hard shells are very durable and resilient. If luggage is dropped, hard-sided luggage offers better impact resistance and therefore better protects fragile items inside. However, hard-sided luggage is commonly constructed by repeated overlaying of material in the same direction therefore leaving the surface to bear a homogenous pattern throughout the entire finished product. Further, the resulting finished luggage is devoid of markings or logos which will leave the luggage unbranded and free of differentiation or source origin through a marking or logo. In order to allow for customization or for purposes of displaying brand for example, a method of incorporating a design to the finished surface of the luggage is required.

SUMMARY OF ILLUSTRATIVE EMBODIMENTS

In one aspect, a method of manufacturing a design-imprinted molded article is disclosed comprising, providing a glass mold of a desired shape; said glass mold further comprises a desired shaped concave and a desired shaped rim; providing a plurality of sheets of polyacrylonitrile fibers; providing at least one design cutout of polyacrylonitrile fibers; overlaying said plurality of sheets on the surface of said desired shaped concave and said desired shaped rim; overlaying said at least one design cutout on said plurality of sheets; applying high heat to said glass mold. In one preferred embodiment, the method is sandwiching a plurality of resin layers between said plurality of sheets. In one preferred embodiment, an additional process of coating the polyacrylonitrile fibers of said plurality of sheets with resin. In one preferred embodiment, the method is disposing said design cutout such that the direction of the polyacrylonitrile fibers of said design cutout form an acute angle with the direction of the polyacrylonitrile fibers of said plurality of sheets; In one preferred embodiment, the method is overlaying a design logo on said plurality of sheets. In one preferred embodiment, the process includes vacuuming said glass mold, said plurality of sheets, and said at least one design cutout. In one preferred embodiment, the design-imprinted molded article is a travel luggage. In one preferred embodiment, the design-imprinted molded article is a helmet. In one preferred embodiment In one preferred embodiment, the design-imprinted molded article is a Frisbee. In one preferred embodiment the design-imprinted molded article is a violin.

In one preferred embodiment the design-imprinted molded article is automobile component product. In one preferred embodiment. In one preferred embodiment, the design-imprinted molded article is fashion products for man. In one preferred embodiment the design-imprinted molded article is a furniture product.

In other aspect of the invention, an design-imprinted molded article comprising a plurality of sheets of polyacrylonitrile fibers; In one preferred embodiment polyacrylonitrile fibers overlaying over said plurality of sheets of polyacrylonitrile fibers and wherein said disposed design cutout is such that the direction of the polyacrylonitrile fibers of said design cutout form an acute angle with the direction of the polyacrylonitrile fibers of said plurality of sheets. In one preferred embodiment the polyacrylonitrile fibers is coated with resin; In one preferred embodiment, the design-imprinted molded article is a travel luggage. In one preferred embodiment the design-imprinted molded article is a helmet. In one preferred embodiment the design-imprinted molded article is a Frisbee. In one preferred embodiment the design-imprinted molded article is a violin. In one preferred embodiment the design-imprinted molded article is automobile component product. In one preferred embodiment the design-imprinted molded article is fashion products for man. In one preferred embodiment the design-imprinted molded article is a furniture product.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE DRAWINGS

In the following detailed description, numerous specific details are set forth in order to provide a thorough understanding of various aspects of the present invention. However, these embodiments may be practiced without some or all of these specific details. In other instances, well-known procedures and/or components have not been described in detail so as not to unnecessarily obscure aspects of the embodiments.

While some embodiments are disclosed here, other embodiments will become obvious to those skilled in the art as a result of the following detailed description. These embodiments are capable of modifications of various obvious aspects, all without departing from the spirit and scope of protection. The Figures, and their detailed descriptions, are to be regarded as illustrative in nature and not restrictive. Also, the reference or non-reference to a particular embodiment shall not be interpreted to limit the scope of protection.

In the following description, certain terminology is used to describe certain features of these embodiments. For purposes of this specification, unless otherwise specified, the term "substantially" refers to the complete or nearly complete extent or degree of an action, characteristic, property, state, structure, item, or result. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 1-10% from the indicated number or range of numbers.

While the invention has application in general to the manufacture of shaped articles, the manufacture of luggage shells is particularly contemplated. Accordingly, the invention will be described in detail with reference to such use.

Figure 1:
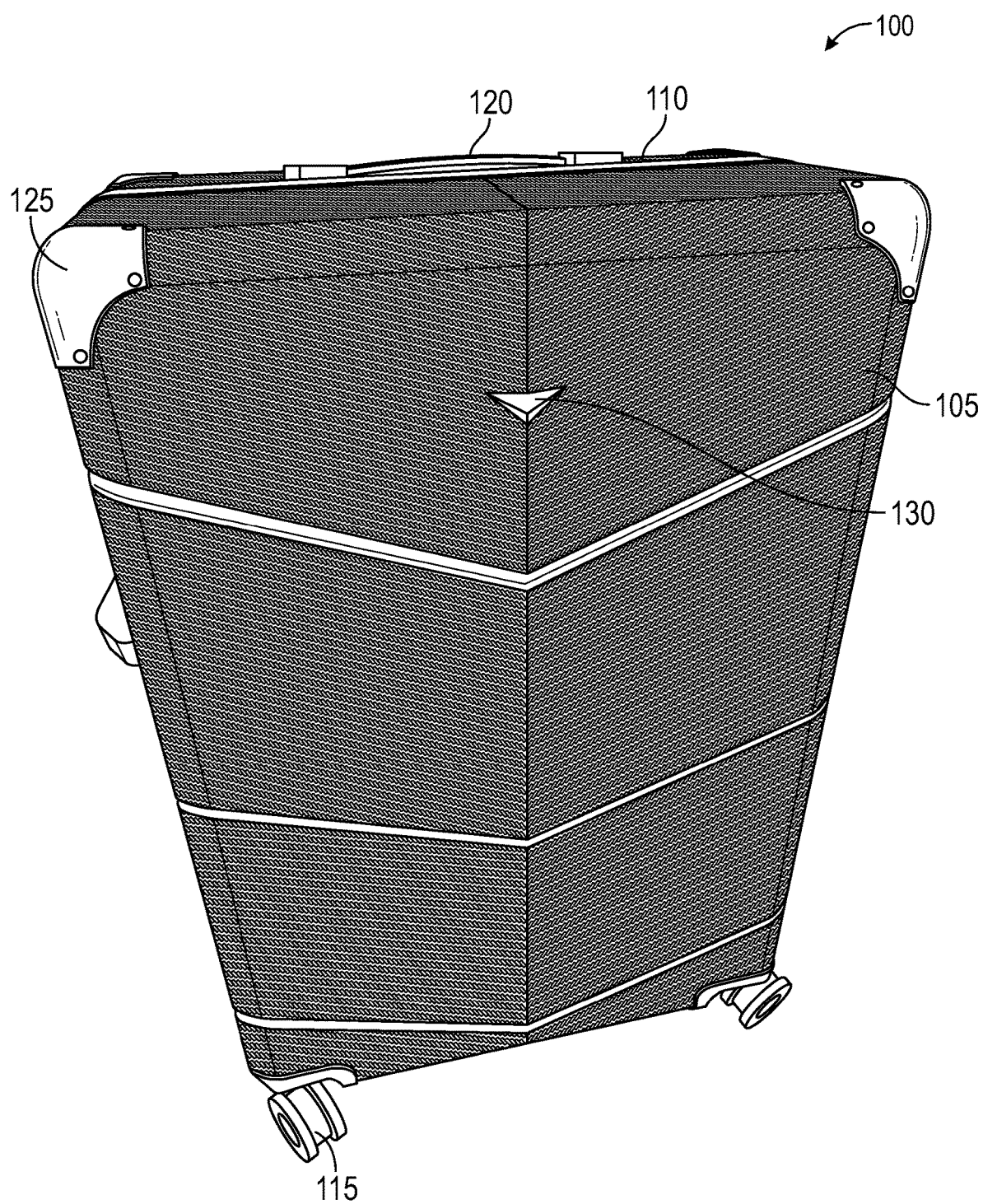
FIG. 1 is an illustration of a top perspective view of an article of luggage.

FIG. 1 is an illustration of a top perspective view of an article of luggage. As shown in FIG. 1, an article of luggage 100 may comprise one or more shells 105, 110. The shells 105, 110 may form the front 105 and back 110 panels of the luggage. The luggage 100 may also comprise a plurality of other components such as wheels 115, handle(s) 120, bumper(s) 125, or the like. It should be appreciated that the luggage 100 may be any size or shape. Preferably, the luggage 100 is hard-sided but it should also be appreciated that the luggage may be soft-sided or a combination thereof. FIG. 1 shows the luggage 100 may be manufactured by mating two rectangular-shaped and hard-sided shells 105, 110.

Preferably, the shells 105, 110 may be manufactured from any type of rigid material in order to form hard-sided luggage 100. The rigid material may comprise carbon fiber, thermoplastic, metal or a combination thereof. The rigid material should be characterized as being strong and durable yet lightweight, making it an attractive option for manufacturing articles such as luggage 100. Preferably, the rigid material comprises carbon fiber consisting of thin, strong crystalline filaments of carbon, used as a strengthening material. The carbon fibers may be about 5-10 micrometers in diameter and comprising substantially of carbon atoms.

FIG. 1 also shows the luggage 100 may comprise one or more design elements such as a logo 130. The logo 130 may be adhered to one or more shells 105, 110 at any time during the manufacturing process. Because the shells 105, 110 may be manufactured by overlaying a plurality of layers within a mold, the logo 130 preferably comprises at least one layer of the plurality of layers. However, it should be appreciated that the logo 130 is not a layer at all and is merely a 3-dimensional structure adhered to an outer surface of one or more shells 105, 110. Although the logo 130 may be manufactured from any type of material, the logo 130 is preferably manufactured from the same type of material as the plurality layers, for example, carbon fiber.

Figure 2:
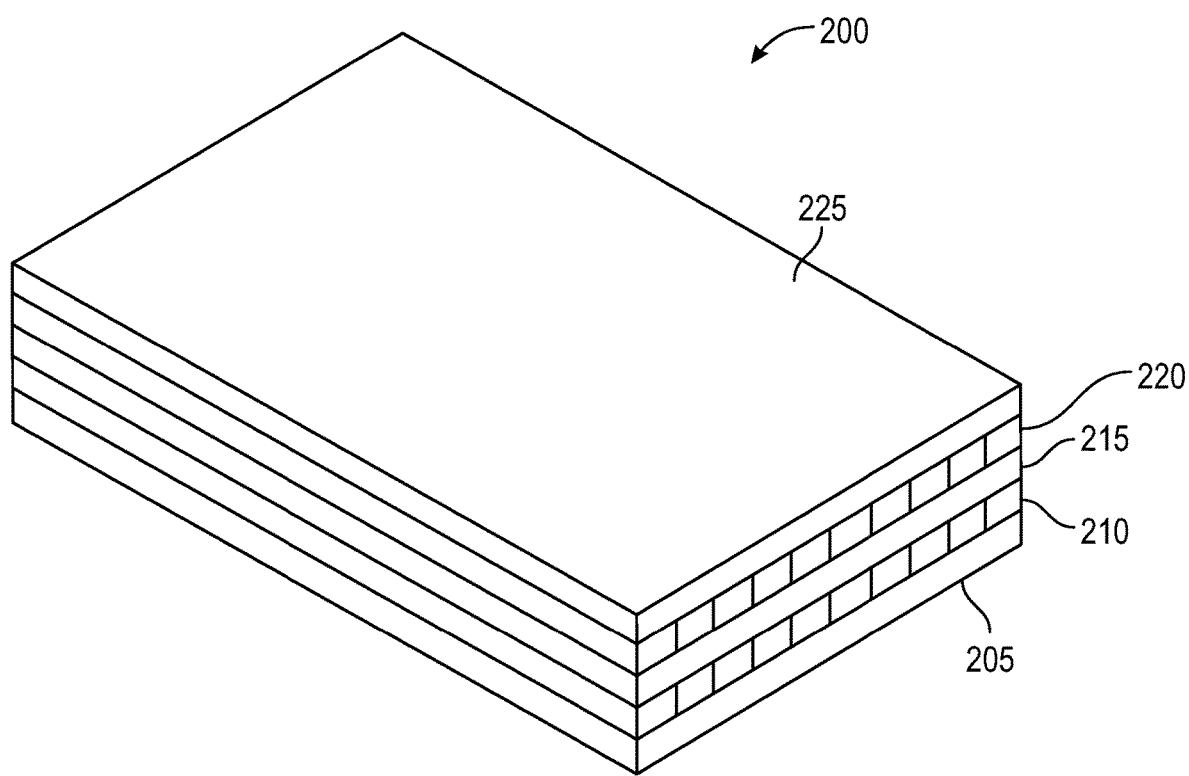
FIG. 2 is an illustration of a top perspective view of a plurality of layers.

FIG. 2 is an illustration of a top perspective view of a plurality of layers. A shell may be manufactured by overlaying a plurality of layers 200 within a mold. Preferably, the plurality of layers 200 are combined at the time of molding however, the plurality of layers 200 can be combined prior to molding by use of a suitable adhesive. If the plurality of layers 200 are combined at the time of molding, the individual layers 205, 210, 215, 220, 225 can be overlaid in a mold subjected to heat and pressure to affect a joining together of the individual layers 205, 210, 215, 220, 225. As shown in FIG. 2, the individual layers may comprise a first layer 205, a first adhesive 210, a second layer 215, a second adhesive 220, a third layer 225 and so on.

The plurality of layers 200 may comprise a plurality of fiber layers. The plurality of fiber layers may further comprise synthetic or natural fiber or a combination thereof. Preferably, the plurality of fiber layers comprise carbon fiber. Almost all carbon fiber is manufactured from a common industrial fiber called polyacrylonitrile fiber, also known as PAN. Most PAN fiber is used to make acrylic fiber. PAN fiber is also used to make carbon fiber with a pyrolizing process, which means it is heated to high temperatures to remove all elements except the carbon. Most carbon fiber is sold at this point and it has a tensile modulus of approximately 33 to 42 million pounds per square inch (MSI), which is a measurement of stiffness. A higher stiffness per cross sectional area ratio ensures that less material can be used to get the same stiffness and therefore a resulting in a lighter article. Further processing can yield higher stiffness by making the fiber smaller and denser. However, these fibers are fairly expensive, brittle, and used sparingly. They are known as High Modulus fiber and are approximately 55 MSI and higher.

The plurality of fiber layers may also be pre-impregnated with a resin. Prepreg is the common term for reinforcing a fiber layer which has been pre-impregnated with a resin. This resin (i.e., epoxy, phenol formaldehyde or the like) already includes a proper curing agent. As a result, the prepreg is ready to lay into a mold without the addition of any more resin. Fabric can be prepegged but most prepreg is unidirectional, meaning it has been spread out onto backing paper. It can be spread out in various thicknesses which is indicated with a Grams per Square Meter (GSM) number. It should be appreciated that varying thicknesses of carbon fiber may be used. For example, a 210 GSM thickness may be used for a first layer then a 450 GSM thickness may be used for a second layer in order to build the thickness more quickly and cost effectively than using the 210 GSM throughout.

Figure 3B:
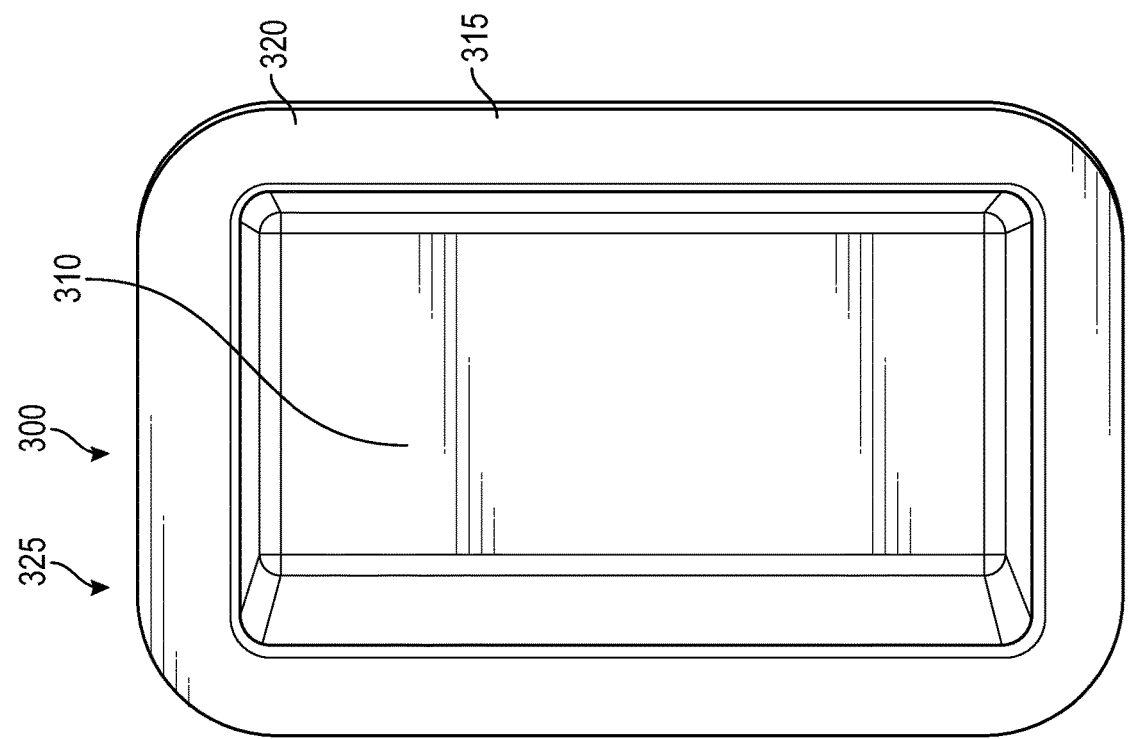
FIG. 3b is an illustration of a top plan view of an exterior surface of a mold.
Figure 3A:
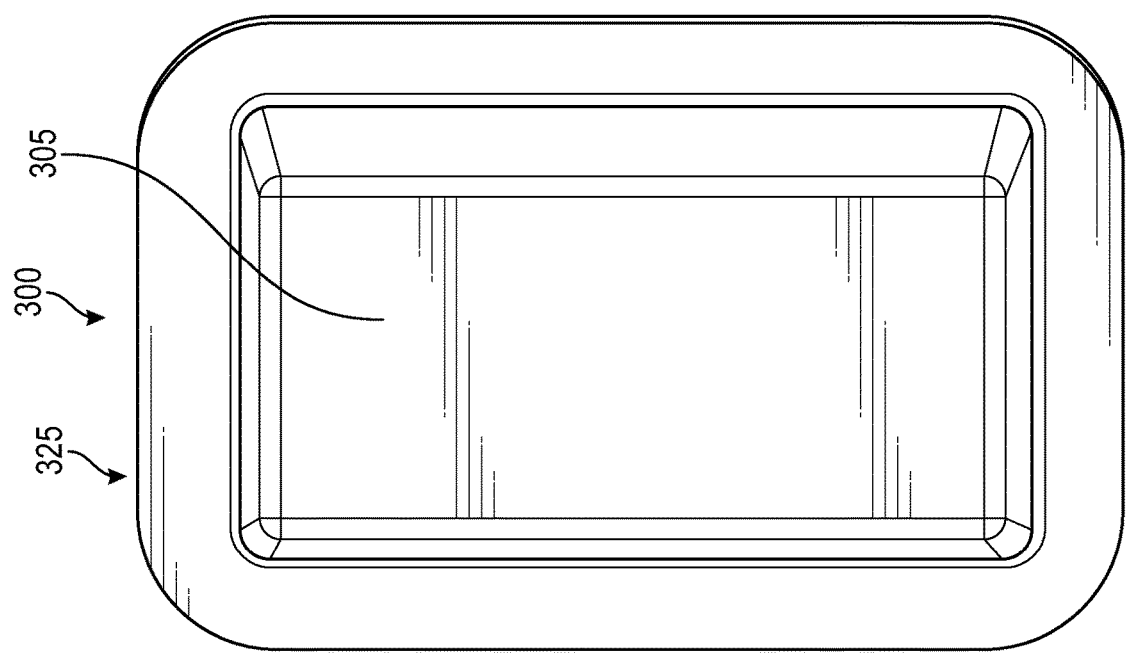
FIG. 3a is an illustration of a bottom plan view of an interior surface of a mold.

FIG. 3a is an illustration of a bottom plan view of an exterior surface of a mold and FIG. 3b is an illustration of a top plan view of an interior surface of a mold. Luggage may comprise one or more concave and/or convex parts. In order to manufacture concave and/or convex parts, an exterior surface 305, as shown in FIG. 3a, and/or an interior surface 310, as shown in FIG. 3b, of a mold 300 may be utilized.

In one embodiment, a shell may be manufactured by applying and covering a surface of a mold 300 with a layer of release agent then overlaying a first layer into the mold and then applying and covering the first layer with a layer of resin. It should be appreciated that if the first layer has been pre-impregnated with a resin, then it is not necessary to further apply and coat the first layer with a layer of resin. The first layer may be overlaid into the mold 300 substantially contacting the entire surface of the mold. In order to achieve this, the process of overlaying may start at a center point 315 of the mold 300 and then the first layer may be pressed into the corners and features of the mold 300 working outward 320.

It should be appreciated that a first layer may be measured and trimmed according to mold specifications prior to being overlaid into the mold 300. However, substantially unadhered portions of the first layer extending beyond an edge 325 of the mold may be trimmed or maintained untrimmed. If the unadhered portions are maintained untrimmed, an adhesive may be applied to an outer surface of the unadhered portions. Accordingly, the outer surface of the unadhered portions may wrap around the edge 325 of the mold 300 and adhere to an opposing surface of the mold 300. For example, when unadhered portions are extending beyond the edge 325 of an exterior surface 305 of a mold 300, the unadhered portions may wrap around the edge 325 of the mold and adhere to an interior surface 310 of the mold 300.

To maintain strength and durability, the process of overlaying the first layer into the mold 300 and applying and covering the first layer with a layer of resin can be repeated numerous times with subsequent layers (i.e., a second layer, third layer, fourth layer, etc.) until the desired amount of layers and thickness is reached. Then a vacuum bag may be utilized to cure and hold the layers together, removing air and impregnating the fibers of the layers with the resin, thereby hardening and setting the article. After curing, the layers and the mold 300 are separated to define a molded article having a surface and structure corresponding to the mold 300.

Although FIG. 3 shows one mold 300, it should be appreciated that more than one mold can be used depending on the size, shape and/or type of article to be manufactured. It should be further appreciated that different types of mold(s) can be used. For instance, a glass mold can be used. However, polyester fiberglass molds are typically unfavorable because their low surface temperature can result in separation of the layers. Polyurethane molds are also typically unfavorable because they can result in cure inhibition.

Figure 4:
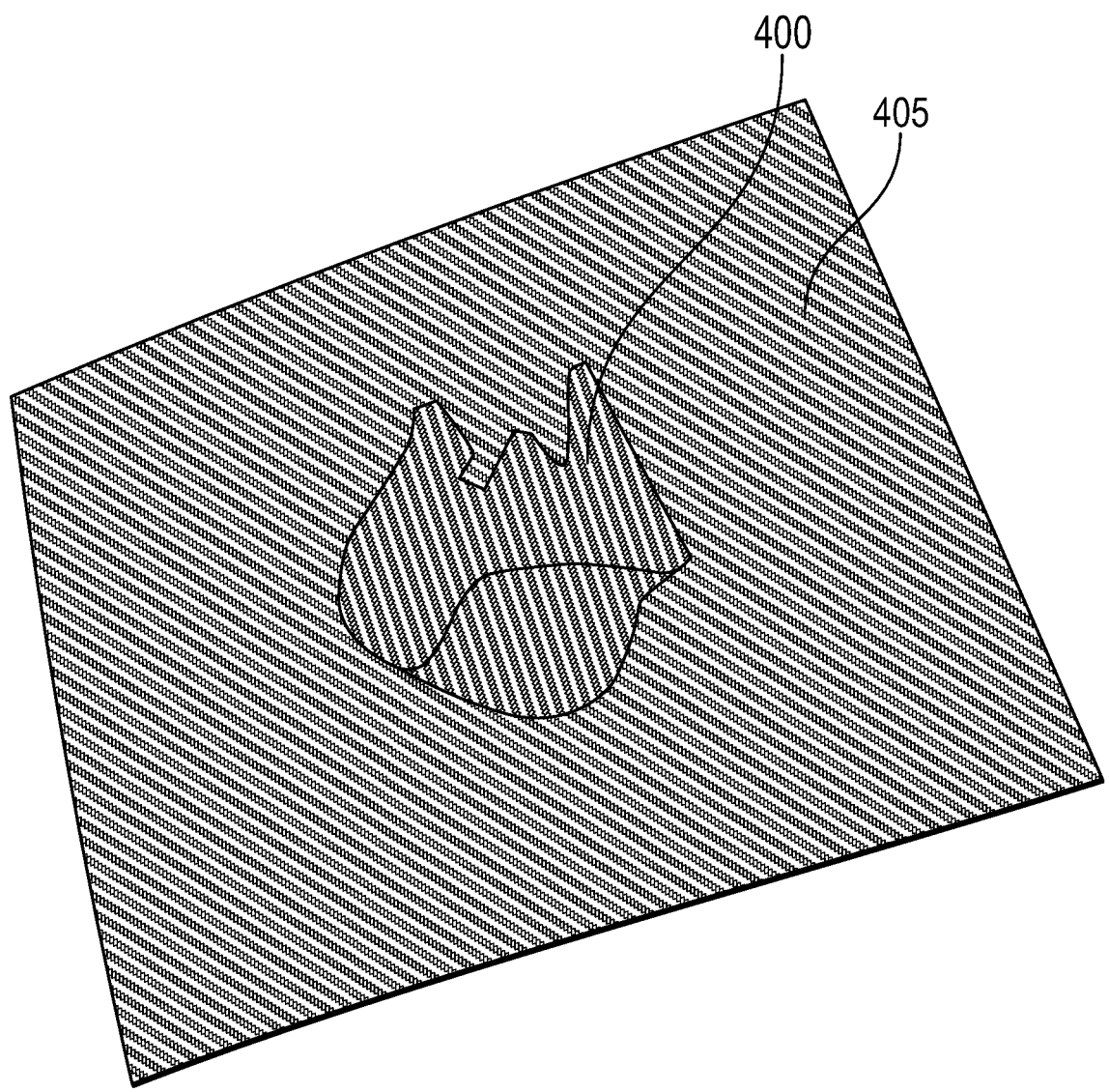
FIG. 4 is an illustration of a top plan view of a design element superimposed on a first layer in 45-degree angle.

FIG. 4 is an illustration of a top plan view of a design element superimposed on a first layer. As shown in FIG. 1, luggage may also comprise one more design elements, such as a logo. FIG. 4 shows a design element 400 adhered to a first layer 405 of carbon fiber. The design element 400 preferably comprises at least one layer of carbon fiber rotated with respect to the first layer 405 such that the direction of the carbon fibers of the design element 400 are juxtaposed with respect to the direction of the carbon fibers of the first layer 405. The design element and the first layer each comprise fibers aligned in a homogenous parallel direction. When the design element is rotated and placed upon the first layer it creates a visible contrast. Preferably, the design element 400 is rotated 45 to 90 degrees with respect to the first layer 405. However, as little as 15 degrees in rotation can also result in a noticeable contrast between the carbon fibers of the design element and the first layer 400, 405. Ideally, the rotation results in the carbon fibers of the design element 400 substantially perpendicular to the carbon fibers of the first layer 405. In this manner, the design element 400 and the first layer 405 form a substantially ornamental and visually appealing layer. However, since the design element 400 may also comprise at least one layer of carbon fiber, the design element 400 may also contribute to the overall structural integrity of the molded article. Furthermore, the method described herein permits the incorporation of one or more design elements 400 into molded articles which was previously unattainable. Accordingly, when it is desired to place a logo onto an article of luggage, the method described herein provides a means to do so. It should be appreciated that a design element 400 may be adhered to layers other than the first layer 405 (i.e., a second layer, third layer, fourth layer, etc.) depending on the effect to be achieved.

Figure 5:
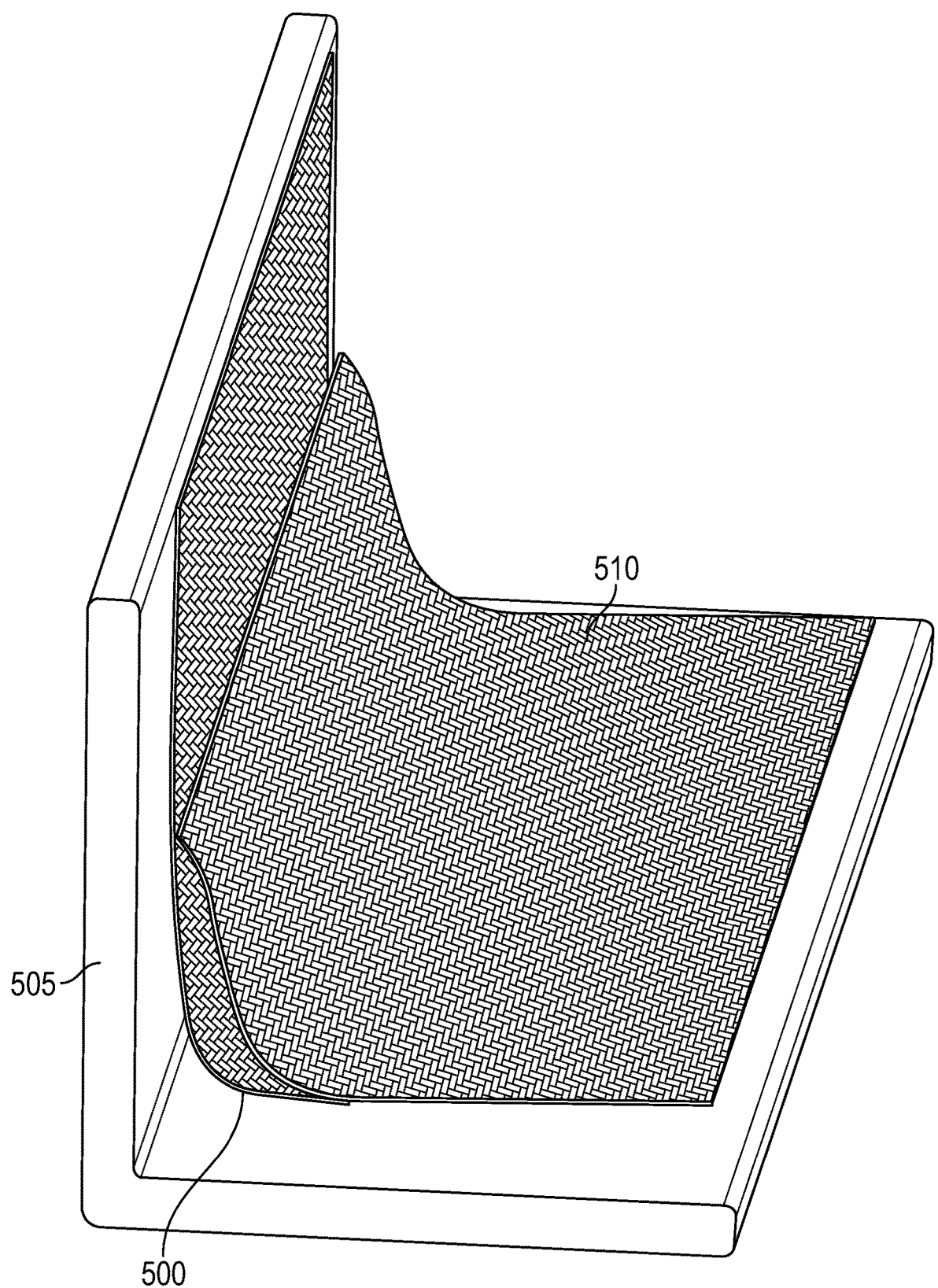
FIG. 5 is an illustration of a right-side view of one or more layers forming a joint.

FIG. 5 is an illustration of a right-side view of one or more layers of material forming a joint. Preferably, layers overlaid into a mold contact the entire surface of the mold. However, corners and features of the mold may create unwanted gaps or spaces 500 in between the mold 505 and a first layer 510 or in between subsequent layers. In order to prevent this, multiple layers may be overlaid at the corners and features of the mold 500 and pressed into the corners and features such that the layers contact the entire surface of the mold.

Figure 6:
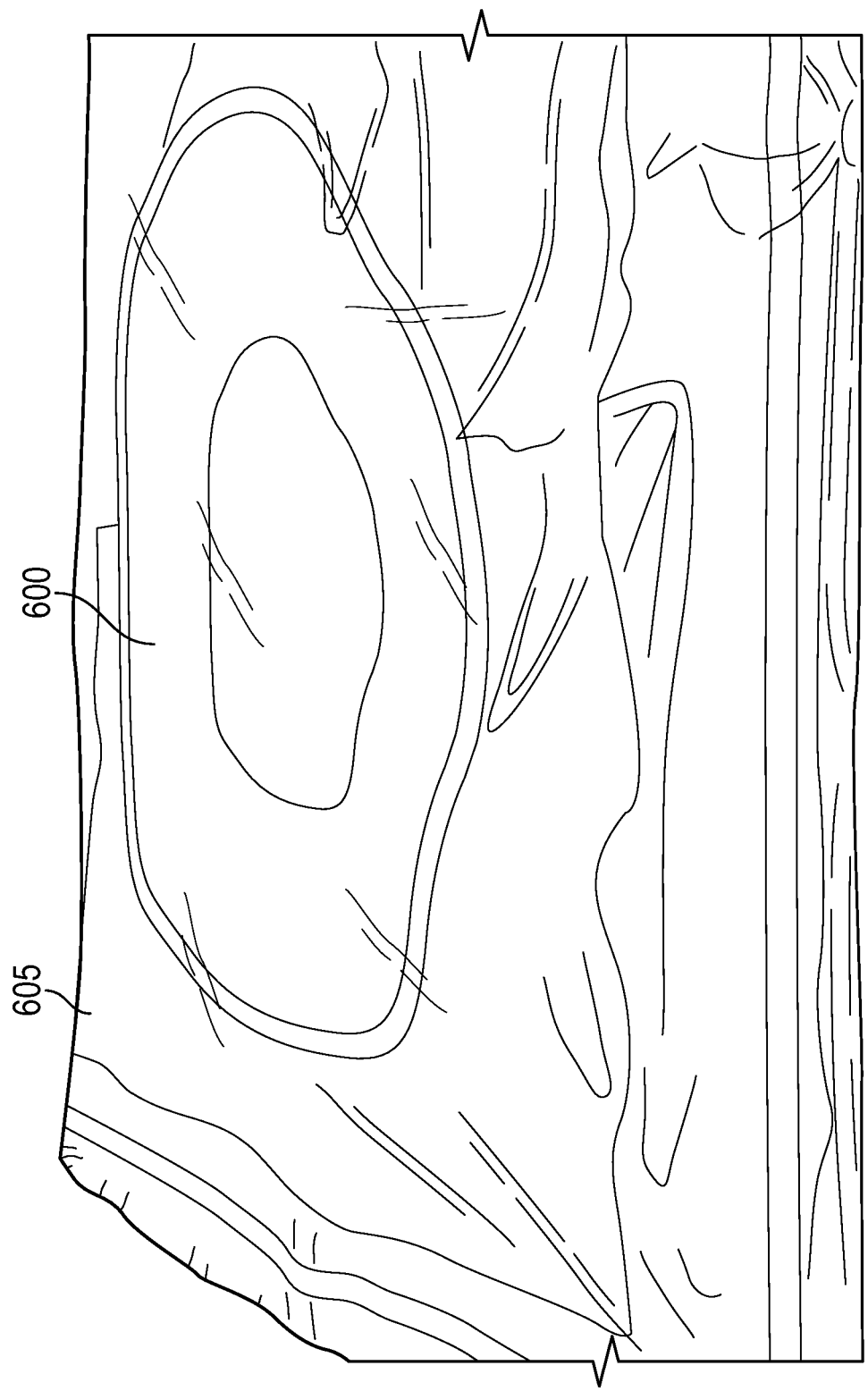
FIG. 6 is an illustration of a top perspective view of a mold within a vacuum seal bag.

FIG. 6 is an illustration of a top perspective view of a mold within a vacuum seal bag. Preferably, the mold 600 is vacuum sealed to compress the mold 600 and evacuate air trapped between the plurality of layers and the surface of the mold 600. In this manner, the number of surface defects on the final product is minimized.

Vacuum sealing can be automated using equipment specifically designed to vacuum seal materials on an industrial/ commercial scale. The plastic film the mold 600 is sealed into may be provided as a bag 605. However, the plastic film is also typically sold on rolls in what is termed a C Fold configuration. In a C Fold configuration, a length of film is unrolled and the edge coming off the roll is sealed using a heat sealer. The mold 600 is then placed between two layers of film, i.e., in the C Fold configuration. The film is further cut and sealed and trapped air is evacuated. It is not a necessity that the sealing be effected by heat. Adhesive sealing is acceptable so long as the vacuum conditions are achieved and maintained. Heat sealing is, however, preferred.

After vacuum sealing, the mold 600 is subjected to oven curing such that the mechanical properties of the article can be realized.

Figure 7A:
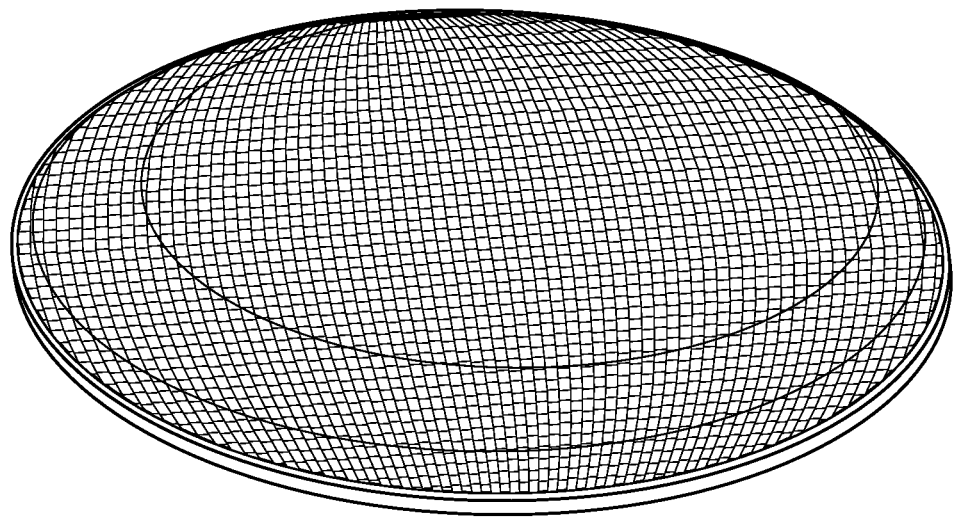
FIG. 7A is an illustration of a perspective view of a carbon fiber Frisbee with a design element.
Figure 7B:
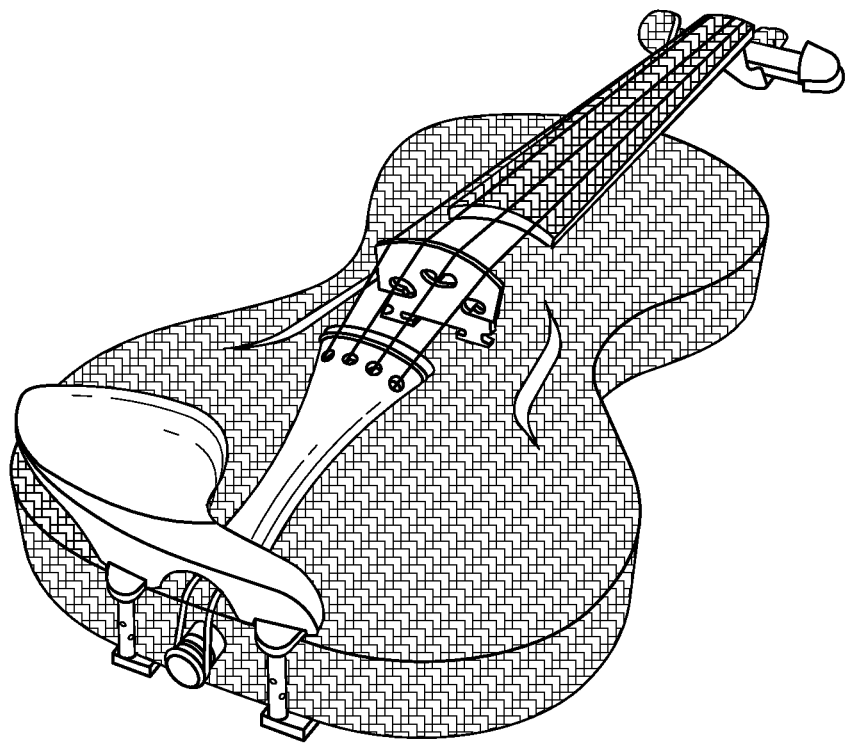
FIG. 7B is an illustration of a perspective view of a carbon violin with a design element.
Figure 7C:
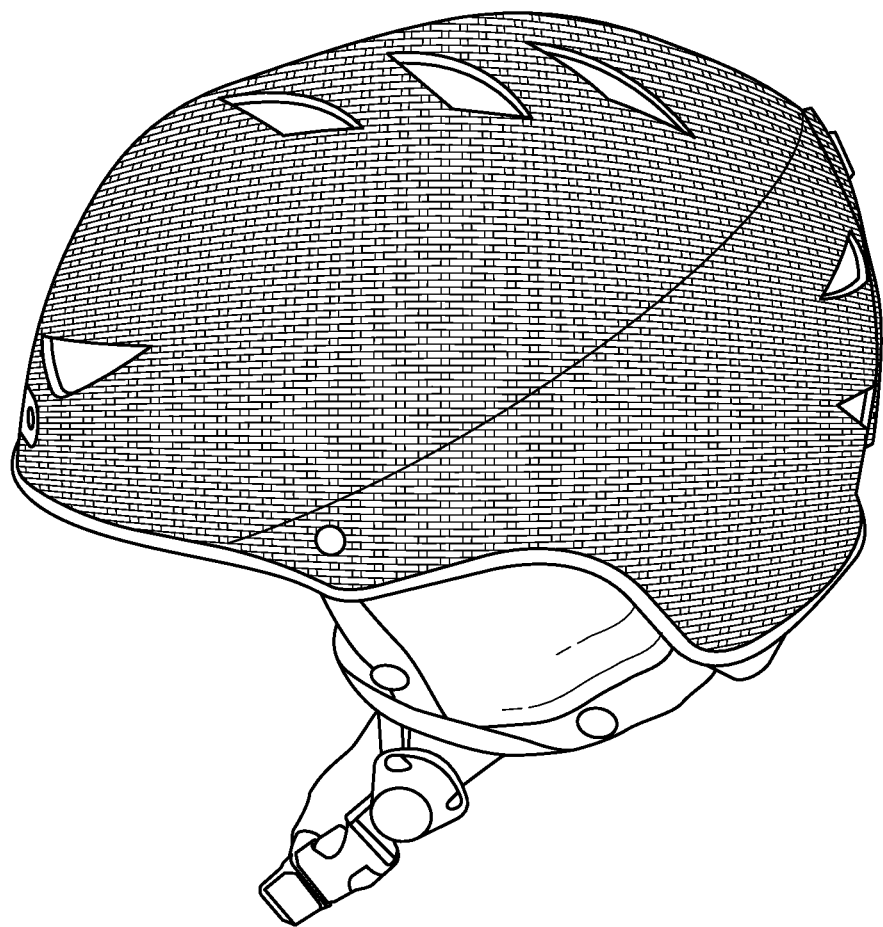
FIG. 7C is an illustration of a perspective view of a carbon helmet with a design element. perspective view of a helmet with a design element.

FIG. 7a is an illustration of a perspective view of a frisbee with a design element. FIG. 7b is an illustration of a perspective view of a violin with a design element. FIG. 7c is an illustration of a perspective view of a helmet with a design element. FIGS. 7a to 7c show the wide applicability of placing a design element on a molded article. Although the mold has been described herein as a mold for an article of luggage, it should be appreciated that any mold can be used. Preferably, the mold will be any mold known in the field of carbon fiber. Examples of such molds include for articles such as outdoor equipment, jewelry, electronics, instruments, vehicle parts, weapons, personal accessories, etc.

Figure 8A:
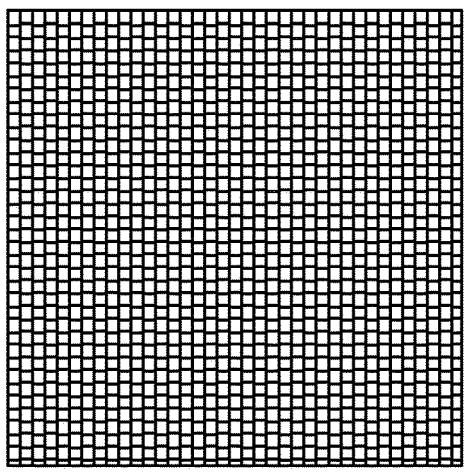
FIG. 8A is a top plan view of a plain weave layer.
Figure 8B:
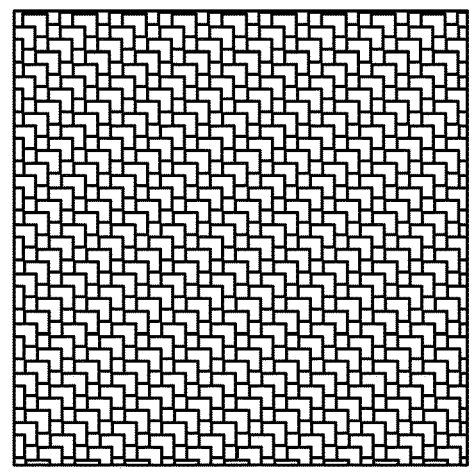
FIG. 8B is a top plan view of a twill weave layer.
Figure 8C:
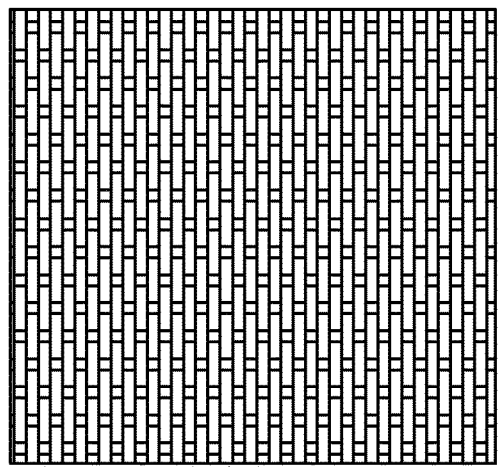
FIG. 8C is a top plan view of a harness satin weave layer.

FIG. 8a is a top plan view of a plain weave layer. FIG. 8b is a top plan view of a twill weave layer. FIG. 8c is a top plan view of a harness satin weave layer. As shown in FIGS. 8a to 8c, the layers can comprise various weave patterns. Preferably, the design element and the layers are of the same weave pattern. It should be appreciated that the design element and the layers can be different patterns rotated with respect to each other to create a visible contrast. The various weave patterns can contribute not only to the overall visual appearance of the molded article, but also to the overall structural integrity of the molded article.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

I claim:

1. A design-imprinted molded article comprising a plurality of sheets of polyacrylonitrile fibers; at least one design cutout of polyacrylonitrile fibers overlaying over said plurality of sheets of polyacrylonitrile fibers and wherein said disposed design cutout is such that the direction of the polyacrylonitrile fibers of said design cutout form an acute angle with the direction of the polyacrylonitrile fibers of said plurality of sheets.

2. The product of claim 1, wherein the polyacrylonitrile fibers of at least one of said plurality of sheets of polyacrylonitrile fibers or said at least one design cutout of polyacrylonitrile fibers is-are coated with resin.

3. The product of claim 1, wherein said design-imprinted molded article is a travel luggage.

4. The product of claim 1, wherein said design-imprinted molded article is a helmet.

5. The product of claim 1, wherein said design-imprinted molded article is a Frisbee.

6. The product of claim 1, wherein said design-imprinted molded article is a violin.

7. The product of claim 1, wherein said design-imprinted molded article is automobile component product.

8. The product of claim 1, wherein said design-imprinted molded article is fashion products for man.

9. The product of claim 1, wherein said design-imprinted molded article is a furniture product.

* * * * *